(12) United States Patent
Fujii et al.

(10) Patent No.: US 7,308,180 B2
(45) Date of Patent: Dec. 11, 2007

(54) OPTICAL WAVEGUIDE AND PROCESS FOR MANUFACTURING THE SAME

(75) Inventors: Akira Fujii, Ashigarakami-gun (JP); Toshihiko Suzuki, Ashigarakami-gun (JP); Keishi Shimizu, Ashigarakami-gun (JP); Kazutoshi Yatsuda, Ashigarakami-gun (JP); Shigemi Ohtsu, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/274,261

(22) Filed: Nov. 16, 2005

(65) Prior Publication Data

US 2006/0275004 A1   Dec. 7, 2006

(30) Foreign Application Priority Data

Jun. 2, 2005   (JP) .............................. 2005-162705

(51) Int. Cl.
G02B 6/10   (2006.01)
(52) U.S. Cl. .................................................... 385/129
(58) Field of Classification Search ................. 385/129
See application file for complete search history.

(56) References Cited

U.S. PATENT DOCUMENTS 6,259,841 B1 *   7/2001   Bhagavatula ................. 385/47
6,741,781 B2 *   5/2004   Furuyama ................... 385/129
6,973,248 B2 *  12/2005   Kropp ......................... 385/131
6,993,213 B2 *   1/2006   Takagi ......................... 385/14
2003/0179991 A1 *  9/2003   Baba et al. ................... 385/27
2005/0175304 A1 *  8/2005   Romagnoli et al. ......... 385/129
2005/0226562 A1 * 10/2005   Romagnoli et al. ........... 385/39

FOREIGN PATENT DOCUMENTS

| JP | A 9-145943 | 6/1997 |
| JP | A 11-248951 | 9/1999 |
| JP | A 2003-75670 | 3/2003 |
| JP | A 2003-207661 | 7/2003 |

* cited by examiner

*Primary Examiner*—Ellen E. Kim
(74) *Attorney, Agent, or Firm*—Oliff & Berridge, PLC

(57) ABSTRACT

The present invention provides an optical waveguide, which at least includes: a waveguide core having a cavity therein; and a clad which encloses the periphery of the waveguide core and has a smaller refractive index than the waveguide core, wherein the optical waveguide changes a direction of a part or all of propagated light by using a part or all of an interface between the waveguide core and the cavity as a reflecting surface. The present invention further provides a method for manufacturing the optical waveguide, which at least includes: forming a core having a cavity therein on a substrate; applying an uncured clad material to a side surface and an upper portion of the core while maintaining the cavity which allows an atmospheric gas to be present in the cavity; and curing the clad material by heat or light to seal the gas in the cavity.

13 Claims, 5 Drawing Sheets

FIG. 1
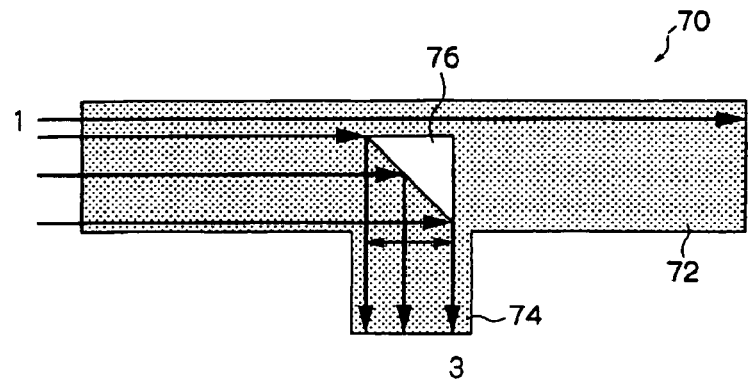
FIG. 2
FIG. 2A
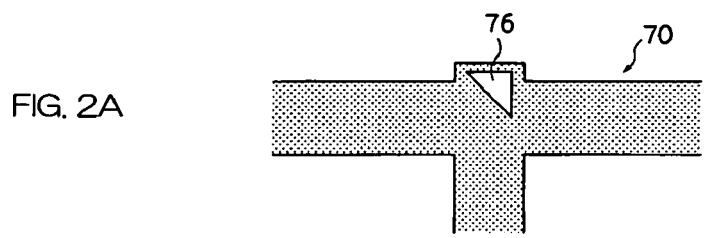
FIG. 2B
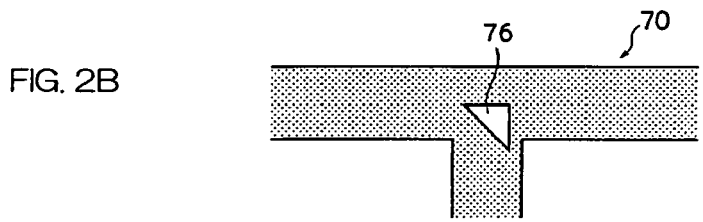
FIG. 2C
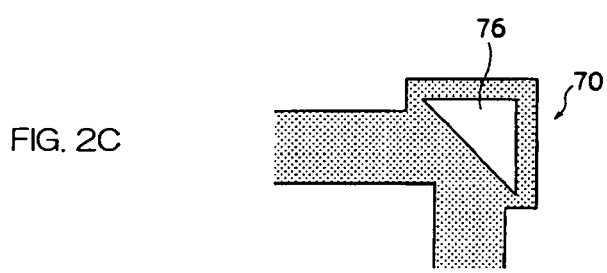

FIG. 8
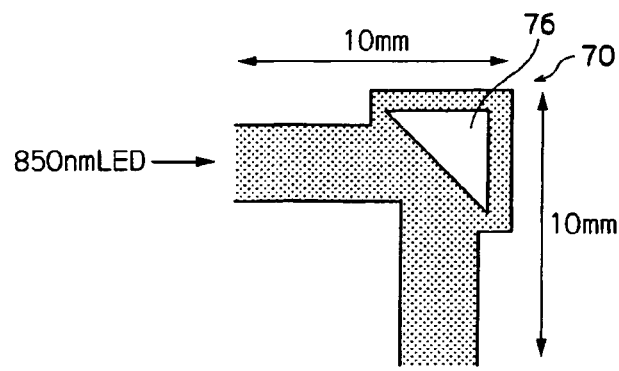
FIG. 9
FIG. 9A
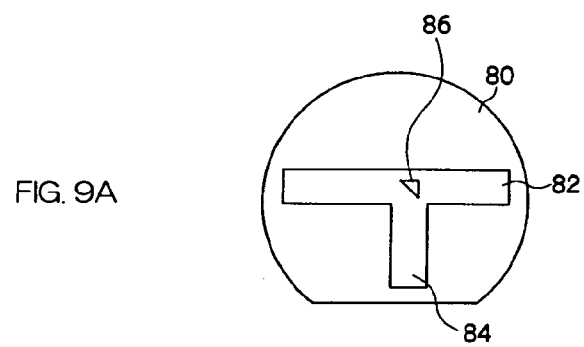
FIG. 9B
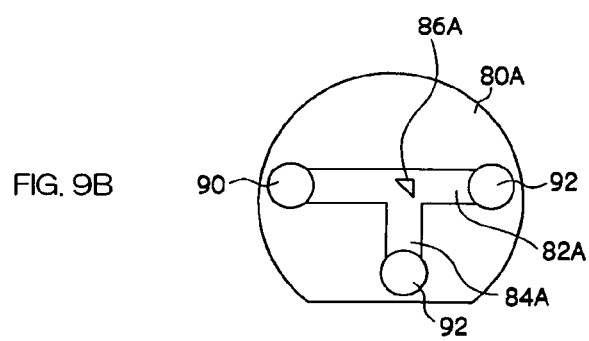
FIG. 9C
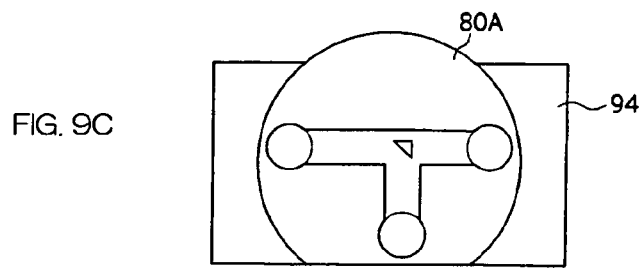

OPTICAL WAVEGUIDE AND PROCESS FOR MANUFACTURING THE SAME

CROSS-REFERENCE TO RELATED APPLICATION

This application claims priority under 35USC 119 from Japanese Patent Application No. 2005-162705, the disclosure of which is incorporated by reference herein.

BACKGROUND OF THE INVENTION

1. Field of the Invention

The present invention relates to an optical waveguide having the function of changing the direction of light propagation.

2. Description of the Related Art

Since the technology of high-speed transmission of signals using electricity is approaching its limit, there are great expectations in the role of optical transmission. In this situation, the realization of an opto-electric hybrid board is regarded as a today's urgent task. In order to realize the opto-electric hybrid board, an optical waveguide corresponding to a highly integrated electrical device is required. It is required for the optical waveguide to attain a large change in the direction of light propagation in a small space within limits imposed by the integration. A polymer waveguide has a higher degree of design freedom than a waveguide formed of quartz materials. Although methods of changing the direction of light propagation using various polymer waveguides are being considered, there are problems such as those described in the following (1) to (3) are imposed.

(1) Problem Relating to Utilizing an Arc

Conventionally, an arc was used for a large change in a direction of light propagation. However, it is not possible to avoid a loss caused by utilization of a radiation mode when an arc is used. In order to reduce this loss, the arc must have a radius of curvature which is larger than a certain value, giving rise to the necessity for securing a large space.

(2) Problem Relating to Utilizing a Total Reflection

The use of total reflection by means of a clad is well known. However, since the difference in refractive index between a core and a clad is small, a large change in direction was not possible. Also, complete total reflection cannot be performed and there is a leakage of light at the total reflecting surface.

(3) Problem Relating to Involving the Production of a Mirror Surface by a Dicing Saw It has been known widely that an optical waveguide is cut at a 45° angle by using a dicing saw and the cut surface is used as a reflecting mirror to change the direction of a light path. However, it is impossible to carry out cutting locally. Also, because the polymer optical waveguide is actually cut in this cutting process, it is difficult to attain this cutting at a place except for the end surface of the optical waveguide. Also, because accuracy of the dicing position is required, leading to an increase in the number of steps as well bringing about high costs.

Among the aforementioned methods, a method involving measures for solving the above problems is proposed in which an arc is utilized and a clad is provided within a core (for example, Japanese Patent Application Laid-Open (JP-A) No. 9-145943). In this method, a sandbank-clad is inserted in the arcing layer and the optical waveguide of the bent part is divided into plural narrow-width optical waveguides to greatly reduce the leakage of light. By this method, the reduction in leakage of light reduces the optical loss and the curvature radius can be made small; however, a limitation to miniaturization remains as before.

As a method of significantly changing the direction of light propagation in a small area, a method can be considered which involves expanding the conditions of total reflection by a localized use of a cladding material having a large difference in refractive index from the core. As an example of such a method, an air clad is proposed (for example, JP-A No. 2003-207661). In this method, an air clad reflecting layer is provided on the exterior of a core in addition to a 90° refraction layer and light is reflected on the air clad. However, in this method, since the air clad layer is located on the exterior, the manufacturing process is complicated and the air clad cannot be easily produced.

Besides the above examples using an air clad, optical waveguides in which a closed void (air foam cell) is provided on the exterior of a bent part of an optical waveguide core which use the planar interface between the void and the core as a reflecting surface are proposed (for example, JP-A Nos. 11-248951 and 2003-75670). In all of these optical waveguides, voids are also present outside of the core of the optical waveguide and the difference in reflection ratios between the void and the core is utilized to constitute a reflecting surface. In the configuration disclosed in JP-A No. 2003-75670, the air clad is formed by etching, but the surface formed by etching tends to be rough, giving rise to the problem that the reflecting surface has a degraded reflecting efficiency. Further, the equipment cost for etching tends to be higher, and the etching process itself is disadvantageous timewise. Also, because the void is an air cell, the whole end surface of the waveguide is not completely in contact with the void due to the method of depositing clad materials and the planar interface is not a perfectly flat surface, optical loss caused by these reasons is inevitable.

Also, the configurations in JP-A Nos. 11-248951 and 2003-75670 must have the whole core of the optical waveguide as a total reflecting surface, and it is therefore impossible to make a branched waveguide structure.

Also, in widely used methods in which a Y-branch or the like is used in a branched waveguide to divide light into plural branches, an increase in a branched angle is accompanied by an increase in light leakage and it is therefore impossible to branch light at a wide angle.

The fundamental cause of these problems is a limitation in the refractive indices of the core and the clad to be used because the NA becomes defined under the conditions of connections between the optical parts such as a fiber and the like and the optical waveguide. Accordingly, it is conceivable that if a clad, which has a different refractive index from that of the core, can be used locally at a place where a direction of light propagation is significantly changed, a large change in the direction of propagation can be realized.

Also, when a polymer having a degree of freedom is used in designing a waveguide, the refractive index of the polymer used for the clad is limited. Therefore, when designing a waveguide without considering NA, such as in the case of directly connecting the waveguide with an optical transmitting and receiving device, the clad is not allowed to have a refractive index significantly different from that of the core, with the result that the direction of light propagation cannot be significantly changed.

SUMMARY OF THE INVENTION

The present invention provides an optical waveguide having the function of significantly changing the direction of light propagation by the use of a reflecting surface comprised of an air clad within the optical waveguide core, and by taking a large refractive index between the local core and the clad. The present invention also provides a process for manufacturing the optical waveguide at a low cost with ease.

Namely, the present invention provides an optical waveguide comprising: a waveguide core having a cavity therein; and a clad which encloses the periphery of the waveguide core and has a smaller refractive index than the waveguide core has, wherein the optical waveguide changes a direction of a part or all of propagated light by using a part or all of an interface between the waveguide core and the cavity as a reflecting surface.

In one aspect of the optical waveguide of the invention, the clad comprises a polymer material.

In another aspect of the optical waveguide of the invention, an angle of the reflecting surface is set at an inclined angle at which the propagated light is totally reflected.

In another aspect of the optical waveguide of the invention, an area, in which a projected area that is obtained by projecting the reflecting surface in the direction of the waveguide core overlaps with a cross-sectional plane of the waveguide core, is smaller than a cross-sectional area of the waveguide core; and a branched waveguide is formed therein which divides the propagated light incident to the waveguide core into light which reflects on the reflecting surface and light, other than light reflected at the reflection surface, which travels in linear propagation in the waveguide core.

In another aspect of the optical waveguide of the invention, a branched waveguide core that propagates the propagated light reflected on the reflecting surface is provided, and a sectional area of the propagated light reflected on the reflecting surface, which is perpendicular to the direction in which the propagated light travels and is in the vicinity of the branched part, is smaller than the sectional area of the branched waveguide core and is contained within the branched waveguide.

In another aspect of the optical waveguide of the invention, an area, in which a projected area that is obtained by projecting the reflecting surface in the direction of the waveguide core overlaps with a cross-sectional plane of the waveguide core, is identical to a cross-sectional area of the waveguide core; and the waveguide core is set so as to be larger only at a portion where the cavity is present.

In another aspect of the optical waveguide of the invention, at least one of both end portions on a diagonal face of the reflecting surface is positioned outside of a line extending from an outside periphery of the waveguide core at the upstream side in the direction in which the propagated light travels, and the waveguide core at the cavity portion is enlarged so as to surround the cavity.

The present invention further provides a method for manufacturing an optical waveguide, comprising: forming a core having a cavity therein on a substrate; applying an uncured clad material to a side surface and an upper portion of the core while maintaining the cavity which allows an atmospheric gas to be present in the cavity; and curing the clad material by heat or light to seal the gas in the cavity.

In one aspect of the method of the invention, the forming of the core comprises: preparing a mold which is formed from a curable resin layer of a mold-forming curable resin and has a concave portion corresponding to the convex portion of the waveguide core and a convex portion corresponding to the cavity; bringing the substrate into close contact with the mold; filling a core-forming curable resin in the concave portion of the mold which is in close contact with the substrate; curing the core-forming curable resin by heat or light; and removing the mold from the substrate so as to form a core having a cavity in the interior therein on the substrate.

The present invention can use the planar interface between the optical waveguide core and the cavity as a reflecting surface by providing a cavity having a fixed reflecting angle and a fixed reflecting width within the optical waveguide core. The reflection of propagated light in a reduced space can be realized (a large change in the direction of light propagation can be realized).

Also, if air is selected as the atmospheric gas used after the optical waveguide core is produced, a large difference in the refractive index between the core and the air clad can be attained at low cost without requiring special apparatuses.

If the diameter of the waveguide after branching is made larger than the area of the section perpendicular to the optical axis of reflected light in the vicinity of the branched part, the reflected light can be propagated without actually touching an end portion of the branched part. It is for this reason that, unlike a conventional Y-branch, the radiation mode loss at the end of the branched part is reduced with the result that a branched waveguide having reduced excess loss at the branched part and ability to change the direction of light propagation can be attained.

An optional branch ratio can be realized by optionally designing the valid sectional area of the reflecting surface with respect to the propagation sectional area of the core.

It is difficult to make the end of the reflecting part of the waveguide core with high precision. There are two end surfaces with respect to propagated light. On the end surface, there are cases where reflection dos not occur as designed, the direction of reflection differs or light passes through the end surface. Consequently, by dispersing the end surface outside the waveguide core with respect to the propagated light, reflection efficiency is raised and excess loss can be suppressed and a change in the direction of propagation can be realized with reduced loss.

If a reflecting gas clad layer having an area smaller than the area of the section of the waveguide whose section is perpendicular to the direction of light propagation is proposed, propagated light can be partially reflected and a wide-angle branched waveguide can be realized.

The present invention does not have a 45° cutting step or the like using a dicing saw or the like to realize a change in the direction of light propagation and is therefore simple and inexpensive.

The manufacturing process of the present invention is simple and low cost. Also, because a mold is used, reproduction becomes possible, making it possible to realize the manufacturing at lower cost.

From the above, the direction of propagated light can be significantly changed locally by the present invention, and a flexible optical integrated circuit, which could not be attained conventionally, can now be produced.

BRIEF DESCRIPTION OF THE DRAWINGS

FIG. 1 is a schematic view showing a typical example of a waveguide core of an optical waveguide to which the present invention has been applied;

FIG. 2 are explanatory diagrams view showing different states of the waveguide core of the optical waveguide shown in FIG. 1;

FIG. 8 is a view corresponding to FIG. 1 which shows the optical waveguide of Example 2; and FIG. 9 are views corresponding to FIG. 1 which shows the optical waveguide of Example 3.

DETAILED DESCRIPTION OF THE INVENTION

Optical Waveguide

Figure 3:
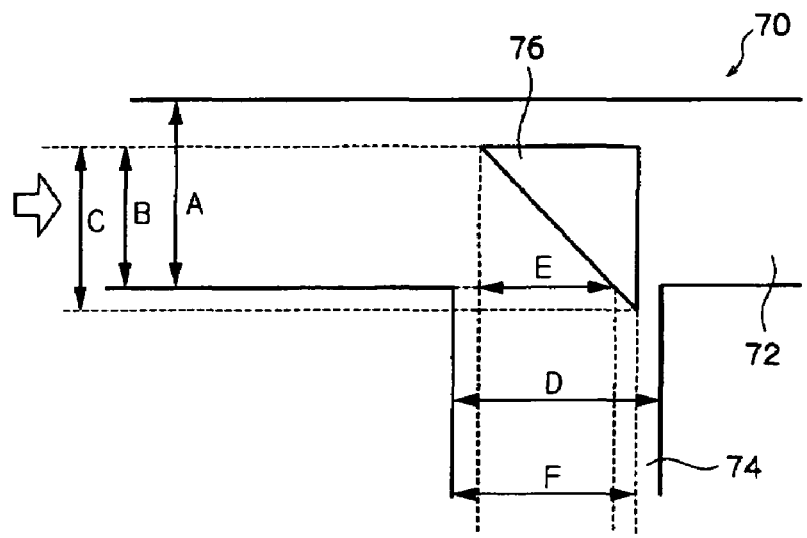
FIG. 3 is a view corresponding to FIG. 1 which explains a valid reflection area in the optical waveguide.

The optical waveguide of the invention is characterized by having at least a waveguide core having a cavity therein and a clad which encloses the periphery of the waveguide core and has a smaller refractive index than the waveguide core. The optical waveguide changes a direction of a part or all of propagated light by using a part or all of an interface between the waveguide core and the cavity as a reflecting surface.

An embodiment of the optical waveguide of the present invention will be explained with reference to FIG. 1. FIG. 1 is a schematic view showing only a waveguide 70 in an example of an optical waveguide to which the present invention is applied. The waveguide core 70 is constituted of a main waveguide core 72 and a branched waveguide core 74, and a cavity 76 is positioned at the branched part between the main waveguide core 72 and the branched waveguide core 74. The cavity 76 has a right-angle and a slanted surface facing the right-angle and the slanted surface forms a reflecting surface due to a difference in the refractive index between the waveguide core 70 and the cavity 76. That, is, among the propagated light incident from an incident side 1 of the waveguide core 70, propagated light that is not affected by the cavity 76 but travels straight is emitted from an emitting side 2 whereas propagated light reaching the cavity 76 is reflected on the reflecting surface of the cavity 76 in the core and emitted from a reflecting side 3.

Specifically, the optical waveguide of the present invention has a cavity having a reflecting angle and an amount of reflected light that are optically set inside of the waveguide core to make use of the planar interface between the cavity and the waveguide core to realize a change in the direction of light propagation by utilizing a relatively large difference in refractive index between the core and the medium inside the cavity. The cavity is regarded substantially as a local gas clad inside of the waveguide core. When, for example, the optical waveguide core has a refractive index of 1.5 and the medium in the cavity is air, total reflection can be realized at an angle up to 41.8° with reference to the normal of the reflecting surface (93.2° to the direction of propagation).

More specifically, when the following conditions are selected to design the waveguide core made of a polymer: refractive index of the core: 1.55, gas in the cavity: air, and the critical angle with the direction of the normal of the reflecting surface: approximately 40°. When the angle of the reflecting surface with respect to the direction of light propagation is 45°, total reflection is possible and as a result, a change in the direction of light propagation of an angle 90° can be attained.

Namely, the above reflecting surface may be designed to have a slanted angle at which the propagated light is totally reflected. When the refractive index of the waveguide core is $n_c$ and the refractive index of the medium in the cavity is $n_g$, the critical angle for total reflection is given by:

$$\theta = \sin^{-1}(n_g/n_c)$$

Also, when an optical fiber is connected to the incident side 1 or emitting side 2 of the optical waveguide or to the reflecting side 3, a difference in NA is pointed out from the viewpoint of connection loss of light. However, in this embodiment, an NA constituted of the refractive index of the core of the optical waveguide and the clad wholly surrounding the core is applied, and does not contribute to the refractive index of the cavity in the waveguide core.

Also, if the reflecting surface of FIG. 1 takes the same angle as or an angle very close to the total reflecting angle, the propagated light can be divided into totally reflected light and partially transmitted light with the result that a branched waveguide can be realized.

Also, the waveguide can be formed as a branched waveguide in which the area where the projected area when the above reflecting surface is projected in the direction of the waveguide core overlaps with the sectional area of the waveguide core is smaller than the sectional area of the waveguide core and the propagated light incident to the waveguide core is divided as branches into light reflecting on the reflecting surface and light that propagates within the waveguide core except at the above reflecting surface and travels linearly. In other words, when the light incident to the reflecting surface is smaller than the reflecting surface side core diameter as viewed from the incident side, it is changed in its direction of propagation by reflection and the light which is not incident to the reflecting surface is not changed in its direction and propagates as it is in the main waveguide, and, as a result, a wide-angle branched waveguide can be realized.

Also, when the area (valid reflection area) where the projected area when the above reflecting surface is projected in the direction of the waveguide core overlaps with the sectional area of the waveguide core is the same as the sectional area of the waveguide core, or, in other words, when the size of the effective reflecting surface is the same as the core diameter as viewed from the incident side, the direction of propagation of propagated light of the main waveguide is changed by total reflection on the reflecting surface.

Here, the valid reflection area will be explained. Here, the direction of light propagation approximates to a parallel direction with respect to the core. FIG. 3 is a view for explaining the valid reflection area wherein the same elements as in FIG. 1 are represented by the same symbols. In FIG. 3, arrow A shows the sectional area of the waveguide core (main waveguide 72), arrow C shows the projected area in the case of projecting at the reflecting surface in the direction of the waveguide core and arrow B shows the area where arrow A and arrow C overlaps each other, and this overlapping area is the valid reflection area. Hereinafter, the part corresponding to the valid reflection area inside of the waveguide core is referred to as a valid core part.

In the branched waveguide 74, on the other hand, arrow D shows the sectional area of the branched waveguide 74, arrow E shows the area, namely, the valid reflection area where the area of the section of the propagated light is reflected on the reflecting surface, which is a section perpendicular to the direction of travel of the propagated light in the vicinity of the branched part that overlaps on the branched waveguide plane, and arrow F shows the projected area when the reflecting surface is projected in the direction of the branched waveguide.

Also, the optical waveguide of the present invention is preferably provided with a branched waveguide core that propagates the propagated light reflected on the reflecting surface, and this area (arrow E in FIG. 3) where the area of the section of the propagated light is reflected on the reflecting surface, which is a section perpendicular to the direction of travel of the propagated light in the vicinity of the branched part hat overlaps with the branched waveguide plane, is preferably smaller than the sectional area (arrow D in FIG. 3) of the branched waveguide core and is preferably included in the branched waveguide. If the optical waveguide is designed as above, the optical loss at the branched end portion can be reduced.

Figure 4:
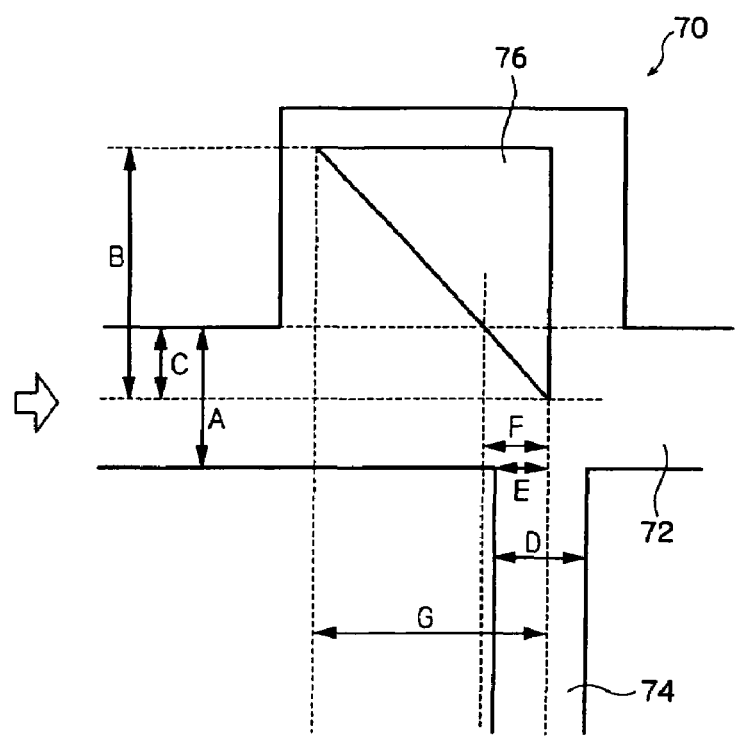
FIG. 4 is a view showing an extreme example of a configuration of the optical waveguide shown in FIG. 3.

It is to be noted that the optical waveguide of the present invention may have a configuration in which the area of the section of the propagated light reflected on the reflecting surface, which is a section perpendicular to the direction of travel of the propagated light in the vicinity of the branched part is not included in the branched waveguide. This configuration will be explained with reference to FIG. 4. In FIG. 4, the same elements as in FIG. 1 or FIG. 2 are represented by the same symbols. In FIG. 4, arrow A shows the sectional area of the waveguide core (main waveguide 72), arrow B shows the projected area in the case of projecting light at the reflecting surface in the direction of the waveguide core, and arrow C shows the area where arrow A and arrow B overlap each other and is, specifically, the valid reflection area. In branched waveguide 74, similarly, arrow D shows the sectional area of branched waveguide 74, arrow E shows the area, namely, the valid reflection area where the area of the section of the propagated light is reflected on the reflecting surface, which is a section perpendicular to the direction of travel of the propagated light in the vicinity of the branched part that overlaps with the branched waveguide plane, arrow F is the area of the section of the reflected propagated light, which is a section perpendicular to the direction of travel of the propagated light in the vicinity of the branched part, and arrow G shows the projected area when the reflecting surface is projected in the direction of the branched waveguide. Specifically, in the configuration shown in FIG. 4, the light (arrow F) reflected on the reflecting surface deviates from the branched waveguide 74.

Also, both end portions of the reflecting surface side of the cavity are sometimes rounded or made at an angle different from the intended reflecting angle. Thereby, the angle of a change in the direction of light propagation is made different from the intended one, resulting in light leakage to the clad, leading to the loss of propagated light. To prevent this, the end of the reflecting surface of the gas cavity is positioned on the outer side on the outside of valid core part of the propagated light of the main waveguide, thereby avoiding the adverse influence of the ends of the reflecting surface (see FIG. 2A to FIG. 2C). In the branched waveguide, either one of the ends of the reflecting surface can be positioned outside of the valid core part of the main waveguide (FIG. 2A and FIG. 2B). Here, the configuration of FIG. 2B is better because the effect of angle expansion of the reflected light in the main waveguide is reduced. Also, in the case of changing the direction of all the propagated light, it is required only for the reflecting surface to have a larger area than the valid sectional area of the main waveguide. In this case, it is therefore only required for both of the reflecting surfaces to be positioned outside of the valid sectional area of the main waveguide core (FIG. 2C). Either one or both end portions in a diagonal face of the reflecting surface is/are positioned outside of the line extended from the outside of the waveguide core at the upstream side in the direction of travel of the propagated light, and the waveguide core at the cavity part is enlarged in such a manner as to surround the cavity.

As mentioned above, the optical waveguide of the present invention changes the direction of light propagation by using the interface between the waveguide core and the cavity as a reflecting surface. This system has the advantage that it makes it possible to change the direction of light propagation locally in a reduced space and also to form a good reflecting surface since the reflecting surface made of a gas cavity is positioned adjacent to the waveguide core in the waveguide core.

The aforementioned optical waveguides of the present invention are preferably used in multi-mode.

Next, explanations will be furnished as to the process for manufacturing an optical waveguide of the present invention, the process being able to manufacture the optical waveguide of the present invention.

The process for manufacturing an optical waveguide of the present invention at least includes: (1) forming a core having a cavity therein on a substrate; (2) applying an uncured clad material to a side surface and an upper portion of the core while maintaining the cavity which allows an atmospheric gas to be present in the cavity; and (3) curing the clad material by heat or light to seal the gas in the cavity.

Hereinafter, the process for manufacturing an optical waveguide according to the present invention will be explained in the order.

(1) Formation of a Core Having a Cavity therein on a Substrate

The formation of a core having a cavity therein particularly preferably involves the following a) to e):

(a) preparing a mold which is formed from a curable resin layer of a mold-forming curable resin and has a concave portion corresponding to the convex portion of the waveguide core and a convex portion corresponding to the cavity;

(b) bringing the substrate into close contact with the mold;

(c) filling a core-forming curable resin in the concave portion of the mold which is in close contact with the substrate;

(d) curing the core-forming curable resin by heat or light; and (e) removing the mold from the substrate so as to form a core having a cavity in the interior therein on the substrate.

According to the method for manufacturing an optical waveguide according to the present invention, the optical waveguide of the present invention can be produced simply because in the formation of the cavity, it is unnecessary to carry out other steps such as an etching step and it is also unnecessary to install any apparatus for carrying out these other steps and the cavity is formed simultaneously when the waveguide core is formed. Also, in the process for manufacturing an optical waveguide according to the present invention, the plane which is to be the reflecting surface in the cavity depends on a precision of the plane corresponding to the cavity in the mold, therefore the precision of the reflecting surface can be easily improved by improving the precision of the plane of the mold.

Hereinafter, a preferable embodiment of the formation (1), specifically the aforementioned (a) to (e) will be hereinafter explained.

(a) Preparation of a Mold which is Formed from a Curable Resin Layer of a Mold-Forming Curable Resin and has a Concave Portion Corresponding to the Convex Portion of the Waveguide Core and a Convex Portion Corresponding to the Cavity The mold is preferably produced using a master plate provided with a convex portion corresponding to the optical waveguide core and a concave portion corresponding to the cavity though the method of producing the mold is not limited thereto. This method using the master plate will be explained.

Production of a Master Plate

A conventional method, such as a photolithographic method, may be used without any particular limitation to produce the master plate provided with a convex portion corresponding to the optical waveguide core and a concave portion corresponding to the cavity. The polymer optical waveguide manufacturing method using an electrodeposition method or a photoelectric deposition method, that is previously filed by the applicant of this case as the patent application Japanese Patent Application No. 2002-10240, may also be used to produce the master plate. A size of the convex portion corresponding to the optical waveguide core is properly decided according to, for example, an object of a utilization of the polymer waveguide. For example, when the optical waveguide is intended for a single mode one, a core which is an about 10 µm by 10 µm square is usually used. when the optical waveguide is intended for a multimode optical waveguide, a core which is an about 50 to 100 µm by 50 to 100 µm square is usually used. An optical waveguide having a larger core part having a size of several hundreds of µm may also be utilized in accordance with an intended use thereof.

Production of a Mold

A mold-forming curable resin is applied to or cast into a surface of the master plate produced as mentioned above on which the convex portion corresponding to the optical waveguide core and the concave portion corresponding to the cavity are formed. The resin is then allowed to stand for a certain period and subjected to a defoaming operation under vacuum for about 10 minutes. After the thus obtained resin layer is dried in accordance with necessity, this resin is cured, and then the cured resin layer is removed so as to form the mold. The mold is formed so as to have an introduction port for filling the concave portion corresponding to the above convex portion with a core-forming curable resin and a discharging port for discharging the resin from the concave portion corresponding to the convex portion. There is no particular limitation to a method for forming the ports. Convex portions corresponding to the introduction port and discharge port may be formed on the master plate in advance. A method is also given as an example of a simple method therefor, in which both ends of the mold that has been removed from the master plate as described above are cut such that the above convex portions are exposed to form an introduction port and a discharge port.

An appropriate thickness of the curable resin layer is generally in a range of about 0.1 to 50 mm, though it is properly determined into consideration of handling characteristics required thereto as a mold.

Also, it is desirable to promote removing of the mold from the master plate by subjecting the master plate to a releasing treatment such as an application of a releasing agent in advance.

The mold-forming curable resin preferably has properties that: a cured material thereof is easily removed from the master plate; a mechanical strength and a dimensional stability thereof are certain levels or more so as to be suitable as a mold that is repeatedly used; having a hardness that is enough to maintain the shapes of the concave portion and the convex portion; and having excellent adhesiveness so as to closely contact to the cladding substrate. Various kinds of additives may be added to the mold-forming curable resin as needs arise.

The mold-forming curable resin is necessary being capable of coated or injected on a surface of the master plate and being capable of accurately copying the convex portions corresponding to respective optical waveguide cores and the convex portions corresponding to the respective cavities. Accordingly, the mold-forming curable resin preferably has a viscosity equal to or less than a certain limit, for instance, approximately from 500 to 7000 mPa·s. (The "mold-forming curable resin" used in the invention includes ones that become an elastic rubber-like body after curing in its scope.) Further, a solvent for adjusting the viscosity may be added to an extent that does not exhibit adverse affect of the solvent.

Examples of the mold-forming curable resin which are preferable from viewpoints of removability, mechanical strength, dimensional stability, hardness, and adhesiveness with the cladding substrate as mentioned above include curable organo-polysiloxanes that become a silicone rubber (silicone elastomer) or a silicone resin after curing. Preferable examples of the curable organo-polysiloxane include those having a methyl siloxane group, an ethyl siloxane group or a phenyl siloxane group in a molecule thereof. The curable organo-polysiloxane may be either a one-component type or a two-component type in which a curing agent is combined. Further, the curable organo-polysiloxane may be either a heat-curable type and a room temperature-curable type (for instance, one that is cured by moisture in air). Furthermore, the curable organo-polysiloxane may be one that uses other curing system (such as UV curing or the like).

The curable organo-polysiloxane is preferably one that becomes silicone rubber after curing. Preferable examples thereof include one that is ordinarily called a liquid silicone rubber (the "liquid" includes one that is high in the viscosity such as a pasty one in its scope) which is used in combination with a curing agent for a two-component type resin. Among these, an addition type liquid silicone rubber is preferably used since it can be uniformly cured from surface to the inside thereof in a short period of time, generates no or little by-product during curing, is excellent in a mold-releasing property and has small shrinkage rate.

Among the liquid silicone rubbers, a liquid dimethyl siloxane rubber is particularly preferable from the viewpoints of adhesiveness, removability, strength and hardness.

A viscosity of the liquid silicone rubber is preferably in a range of approximately from 500 to 7,000 mPa·s, and more preferably in a range of approximately from 2,000 to 5,000 mPa·s, from the viewpoints of accurate copying of the convex portions corresponding to the optical waveguide cores and the concave portions corresponding to the cavities, reducing air bubbles mingle and thereby making vaccum defoaming easier, and forming the mold having a thickness of several millimeters.

Further, a surface energy of the mold is in a range of approximately 10 to 30 dyn/cm, and preferably in a range of approximately 15 to 24 dyn/cm, in view of adhesiveness thereof with the substrate.

A Share rubber hardness of the mold is in a range of approximately 15 to 80 and preferably in a range of approximately 20 to 60 from the viewpoints of a molding performance, maintenance of shape of the concave portion and the removability thereof.

A surface roughness (root-mean-square (RMS) roughness) of the mold is approximately 0.2 μm or less and preferably approximately 0.1 μm or less from the viewpoint of the molding performance thereof.

Further, the mold is preferably transmissive for light which is in UV region and/or visible region. The reason for the mold being preferable to be light transmissive in the visible region is that when the mold is brought into close contact with the cladding substrate in the process (2) described below, positional alignment can be easily performed, and in the process (3) described below, the situations where the core forming curable resin is filled in the mold concave portion can be observed and thereby completion of the filling and the like can be easily confirmed. Further, the reason for the mold being preferable to be light transmissive in the UV region is that in the case of a UV curable resin being used as the core forming curable resin, the UV light curing is performed through the mold. In this case, the transmittance of the mold in the UV region (from 250 to 400 nm) is preferably approximately 80% or more.

The curable organo-polysiloxane, particularly the liquid silicone rubber that becomes silicone rubber after being cured, is excellent in the properties of adhesiveness with the cladding substrate and removability therefrom, which are usually incompatible with each other. It has the capability of copying a nanostructure, and can also prevent an intrusion of liquid when the silicone rubber and the cladding substrate are brought into close contact. The mold that uses such silicone rubber can copy an master plate with high precision and come into close contact with the cladding substrate, therefore, an interface between the core and the cavity, that is the reflecting surface, and an interface between the core and the clad around the core, that is a side surface of the core, are formed in extremely good condition. Further, the core forming resin can be efficiently filled only in the concave portion between the mold and the cladding substrate, and the cladding substrate and the mold can be easily removed. Accordingly, a polymer optical waveguide that maintains a shape with high precision can be extremely easily prepared by using the mold.

Further, a portion of the cured resin layer which is other than a portion that copies a convex portion and the concave portion of the master plate can be replaced by other stiff material so as to improve a handling property of the mold. The improvement effect is remarkable in the case that the cured resin layer has a rubber elasticity.

(b) Bringing the Substrate into Close Contact with the Mold

A material of the substrate of the optical waveguide of the invention is selected in consideration of optical characteristics such as a refractive index, light transmittance or the like, mechanical strength, heat-resistance, flexibility and the like of the material in accordance with the applications thereof. It is preferable to prepare a polymer optical waveguide having the flexibility by using a flexible film substrate.

Examples of a material of the film include acrylic resins (such as polymethyl methacrylate or the like), alicyclic acrylic resins, styrenic resins (such as polystyrene, acrylonitrile/styrene copolymer or the like), olefinic resins (such as polyethylene, polypropylene, ethylene/propylene copolymer or the like), alicyclic olefinic resins, vinyl chloride resins, vinylidene chloride resins, vinyl alcohol resins, vinyl butyral resins, allylate resins, fluorine-containing resins, polyester resins (such as polyethylene terephthalate, polyethylene naphthalate or the like), polycarbonate resins, di- or triacetate celluloses, amide resins (such as aliphatic amides, aromatic amides or the like), imide resins, sulfonic resins, polyether sulfonic resins, polyether ether ketone resins, polyphenylene sulfide resins, polyoxymethylene resins, or compsitions formed by blending the above resins.

Examples of the alicyclic acrylic resin include OZ-1000, OZ-1100 (both trade names, manufactured by Hitachi Chemical Co., Ltd.) in that an aliphatic cyclic hydrocarbon such as tricyclodecane or the like is introduced in an ester substituent.

Further, examples of the alicyclic olefinic resin include those having a norbornene structure on a main chain and those having a norbornene structure on a main chain and a polar group such as an alkyloxycarbonyl group (alkyl group with from 1 to 6 carbon atoms or cycloalkyl group) on a side chain. Among these, alicyclic olefinic resins as mentioned above that have a norbornene structure on a main chain and a polar group such as an alkyloxycarbonyl group on a side chain have excellent optical characteristics such as low refractive index (since the refractive index is approximately 1.50, the difference with the refractive index of the core clad can be secured) and high light transmittance, excellent adhesiveness with the mold, and excellent heat-resistance. Accordingly, these are particularly preferable for the preparation of a polymer optical waveguide according to the invention.

In view of securing the refractive index difference with the core, the refractive index of the substrate is preferably less than approximately 1.55, and more preferably less than approximately 1.53.

Further, a substrate in which a clad material is coated thereon can also be used as the cladding substrate. A utilization of such substrate can improve a flatness of the substrate of the optical waveguide of the present invention. Furthermore, a material that has high birefringence and is not suitable for the clad material, or a material that is inferior in transparency, also can be made usable as the substrate of the optical waveguide of the present invention when it is coated with the clad material as described above.

(c) Filling a Core-Forming Curable Resin in the Concave Portion of the Mold which is in Close Contact with the Substrate In the filling process, a core forming curable resin is filled in a concave portion of a mold other than a convex portion of the mold corresponding to the cavity from the inlet of the mold by utilizing a capillary phenomenon, while the core forming curable resin filled in the concave portion is exhausted from the outlet of the mold.

Examples of the core forming curable resin include radiation curable resins, electron beam curable resins, and thermosetting resins. Among these, UV curable resins and thermosetting resins can be preferably used.

Examples of the core forming UV curable resins or thermosetting resins include UV curable monomers, thermosetting monomers, UV curable oligomers, thermosetting oligomers, mixtures of UV curable monomer and UV curable oligomer, and mixtures of thermosetting monomer and thermosetting oligomer.

Examples of the UV curable resin include UV curable epoxy resins, UV curable polyimide resins, and UV curable acrylic resins.

In order to fill a gap (concave portion of the mold) formed between the mold and the substrate with a core forming curable resin by capillary phenomenon, the core forming curable resin that is used necessarily has a low viscosity that is enough to enable such filling process. Accordingly, the viscosity of the curable resin is adjusted in a range of approximately 10 to 2,000 mPa·s, preferably from approximately 20 to 1,000 mPa·s, and more preferably from approximately 30 to 500 mPa·s.

In addition, in order to reproduce original shapes, which the convex portion corresponding to the optical waveguide core and the concave portion corresponding to the cavity formed on the master plate has, with high fidelity, a volume change (difference) between a volume of before the curing and a volume of after the curing of the curable resin is necessarily small. For instance, a decrease in the volume of the curable resin causes a loss of the waveguide. Accordingly, the volume change of the curable resin is desirably as small as possible; that is, it is desirable to be approximately 10% or less and preferably approximately 6% or less. A lowering of the viscosity by use of a solvent is desirably avoided since such an adjustment causes a large volume change between a volume of before the curing and a volume of after the curing.

In order to reduce the volume change (shrinkage) after the curing of the core forming curable resin, a polymer can be added to the resin. As the polymer, one that is compatible with the core forming curable resin and does not adversely affect on the refractive index, elasticity and light transmittance of the resin is preferable. The addition of the polymer enables to precisely control the viscosity and the glass transition temperature of the cured resin, in addition to redicing the volume change. Examples of the polymer include acrylic resins, methacrylic resins, and epoxy resins, however, the polymer is not limited thereto.

A refractive index of the cured body of the core forming curable resin is necessarily larger than that of the substrate to be a clad (including the cladding layer in the following (d)). The refractive index should be approximately 1.50 or more, and preferably approximately 1.53 or more. The difference between the refractive index of the clad (including the cladding layer in the following (d)) and that of the core is greater 0.01 or more and preferably greater 0.03 or more.

Further, in order to promote the filling of the core forming curable resin into the mold concave portion by capillary phenomenon, a total system of the process is preferably set in a reduced pressure (approximately from 0.1 to 200 Pa) or suctioned by use of a through cavity.

Furthermore, in order to expedite the filling, in addition to the reduction of pressure of the system, the core forming curable resin that is filled in from the inlet of the mold can be effectively heated to lower the viscosity.

(d) Curing the Core-Forming Curable Resin by Heat or Light

The filled core forming curable resin is cured. In curing a UV curable resin, a UV lamp, UV LED, UV irradiation device and so on are used. Furthermore, in curing a thermosetting resin, an oven or the like is used for heating.

(e) Removing the Mold from the Substrate so as to Form a Core Having a Cavity in the Interior therein on the Substrate After the process (d), the mold is removed from the substrate.

A core having a cavity therein is formed by the above steps. However, a method of producing a core having a cavity therein on a substrate is not limited to the above production method and, for example, a direct exposure method and an etching method may be applied. However, the above method is preferably selected from the viewpoint of cost and simplicity.

(2) Applying an Uncured Clad Material to a Side Surface and an Upper Portion of the Core While Maintaining the Cavity which Allows an Atmospheric Gas to be Present in the Cavity In this application, a clad layer is formed on the film substrate, which is obtained by above forming process of (1) and formed with the core. As to the technologies for applying an uncured clad material to the side surface and the upper part of the core while keeping the above cavity, it is preferable to use a highly viscous curable resin as the clad material. Specifically, the gas is confined within the cavity in the core by applying a non-solid clad (uncured clad material) to the side surface and upper part of the core. A highly viscous curable resin is preferably used to stop the amount of the clad material entering the cavity. A viscosity of the resin is preferably in a range of approximately 30 mPa·s to 3000 mPa·s from the viewpoint of compatibility with productivity, and more preferably in a range of approximately 100 mPa·s to 2000 mPa·s from the viewpoint of yield.

As the clad curable resin, an ultraviolet-curable resin or a heat-curable resin is preferably used. For example, an ultraviolet-curable or heat-curable monomer or oligomer and a mixture of a monomer and an oligomer is used.

In order to reduce a reduction in volume (shrinkage) after the clad-forming curable resin is cured, a polymer (e.g., a methacrylic acid type and epoxy type) that has compatibility with the resin and no adverse influence on the refractive index, elastic modulus and transmission characteristics of the resin may be added to the resin.

Here, because the atmosphere in this step constitutes a medium in the cavity as it is, this step is carried out in the atmosphere of the gas, which is intended to be present inside of the cavity. As the gas, air is preferable because it is simplest and also from the viewpoint of cost.

Polymers which are similar to the polymer to be added to the clad layer may be added thereto so as to reduce a change (shrinkage) in a volume of the ultraviolet curable resin or heat-curable resin after the resin is cured.

The refractive index of the clad layer is approximately 1.55 or less and preferably approximately 1.53 or less to secure the difference in refractive index between the clad layer and the core. Also, a difference in refractive index between the substrate for the clad and the clad layer is preferably small and the difference is preferably approximately 0.05 or smaller, preferably approximately 0.001 or smaller, and more preferably approximately zero (no difference) from the viewpoint of confining light.

In a method of manufacturing an optical waveguide according to the invention, in particular, a combination where as the mold-forming curable resin, liquid silicone rubbers that become rubber-like form after curing, especially liquid dimethyl siloxane rubber, is used and as the cladding substrate, an alicyclic olefinic resin that has a norbornene structure on a main chain and a polar group such as an alkyloxycarbonyl group, etc. on a side chain is used is preferable. In this combination, adhesiveness between the mold and the cladding substrate is quite good, the concave portion structure of the mold does not deform, a curable resin can be speedily filled into the concave portion owing to the capillary phenomenon even when a cross sectional area of the concave portion structure is extremely small (for instance, a rectangle of 10×10 μm).

(3) Curing the Clad Material by Heat or Light to Seal the Gas in the Cavity

In this curing, in succession to the applying process (2), the clad material is cured by heat or light to confine the gas in the cavity and also to complete an optical waveguide.

In curing a UV curable resin as a clad material, a UV lamp, UV LED, UV irradiation device and so on are used. Furthermore, in curing a thermosetting resin, an oven or the like is used for heating.

Figure 5:
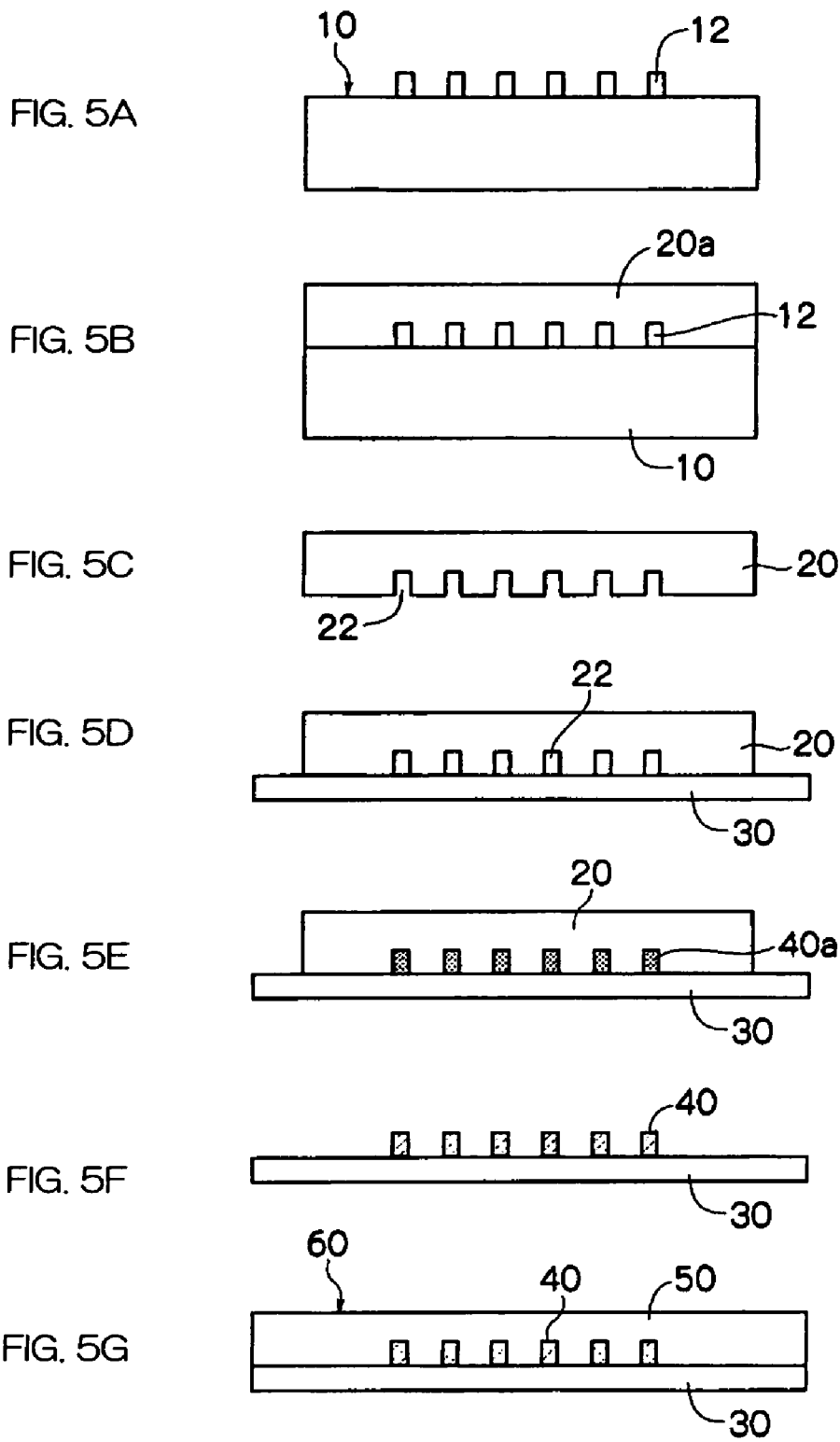
FIG. 5 are conceptional views showing an embodiment of the steps of manufacturing the optical waveguide of the present invention.

Next, an embodiment of the forming process (1) will be explained with reference to FIG. 5 and FIG. 6. The following explanations show a process of producing a non-branched linear optical waveguide wherein a cavity is omitted for the sake of explanation simplicity.

Figure 6:
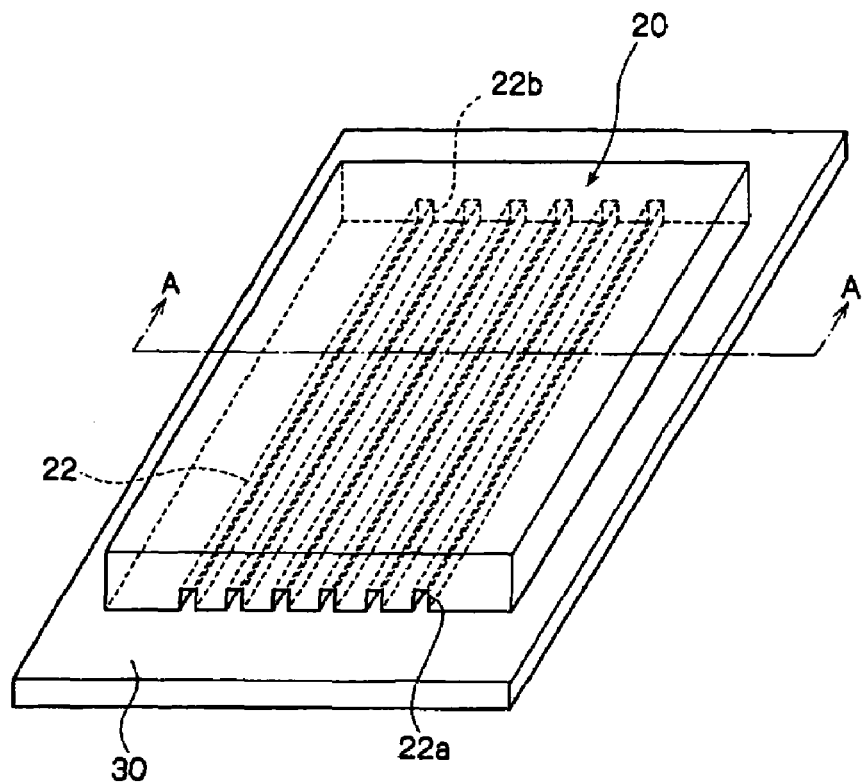
FIG. 6 is a perspective view showing a situation in which a mold is brought into close contact with a substrate for a clad.

FIG. 5A to FIG. 5G are conceptional views showing each production stage in the manufacturing method according to the present invention, and FIG. 6 is a perspective view showing the situation (step shown by FIG. 5D) where a mold is brought into close contact with a substrate for a clad which is one pitch larger than the mold.

FIG. 5A shows a section of a master plate 10 when the master plate 10 formed with a convex portion 12 corresponding to an optical waveguide core is cut at a right angle with the longitudinal direction of the convex portion 12.

Then, as shown in FIG. 5B, a cured resin layer 20a of a mold-forming curable resin is formed on the surface of the master plate on which surface the convex portion 12 is formed. FIG. 5B shows a section of a master plate 10 when the master plate 10 formed with a cured resin layer 20a of a mold-forming curable resin is formed is cut at a right angle with the longitudinal direction of the convex portion 12.

Then, the cured resin layer 20a of a mold-forming curable resin is removed off to make a model (not shown) and then both ends of the mold are cut such that the above concave portions 22 are exposed to form an introduction port 22a (see FIG. 6) for filling a core-forming curable resin in the concave portion 22 and a discharge port 22b (see FIG. 6) for discharging the above resin from the concave portion 22 corresponding to the above convex portion 12, to produce a mold 20.

A substrate 30, that is a substrate for a clad, is brought into close contact with the mold 20 produced in this manner (see FIG. 5D and FIG. 6). FIG. 5D shows a sectional view taken at right angle with a longitudinal direction of the concave portion of the mold with which the substrate is into close contact (A-A section in FIG. 6). Next, a core-forming curable resin 40a is filled in the concave portion 22 of the mold from the introduction port 22a of the mold by utilizing a capillary phenomenon. The core-forming curable resin is discharged from the discharge port 22b disposed at the other end of the concave portion 20. FIG. 5E shows a sectional view taken at right angle with the longitudinal direction of the concave portion of the mold in which a curable resin is filled in the concave portion.

Then, the core-forming curable resin in the concave portion of the mold is cured to remove off the mold. FIG. 5F shows a sectional view taken at right angle with the longitudinal direction of the core of the optical waveguide in which the optical waveguide core 40 is formed on the substrate for the clad.

Then, in the present invention, the above core is placed under the atmosphere of the gas which is desirably filled in the cavity and a clad material is applied to the surface of the substrate for the clad on which surface the core is to be formed and as a result, a clad layer 50 is formed without any penetration of the clad agent into the cavity because of the viscosity of the clad agent. Then, the clad resin is cured to produce an optical waveguide 60. FIG. 5G shows a sectional view when the polymer optical waveguide 60 is cut at right angle with the longitudinal direction of the core.

Further, in a method of manufacturing an optical waveguide according to the invention, it is preferable that the mold is provided with two or more through cavities that communicate, respectively, with one ends and the other ends (inlets and outlets for filling or exhausting the core forming curable resin) of the concave portions corresponding to the optical waveguide core convex portions; and into the through cavity at one end of the concave portion of the mold, the core forming curable resin is filled in, and from the through cavity at the other end of the concave portion of the mold, vacuum suction is applied to fill the core forming curable resin in the concave portion of the mold. By filing the core forming curable resin by use of the mold as mentioned above, the filling speed can be drastically increased, adhesiveness between the mold and the substrate is further improved and air bubbles can be inhibited from mingling.

Two or more through cavities can be disposed. In the case of there being for instance one Y branch, three through cavities are necessary to be disposed, and in the case of there being three Y branches to form 1 to 8 branching, nine through cavities are necessary to be disposed to fill the core forming curable resin in the concave portions. Furthermore, the branching can include multi-stage branching.

The through cavity that is disposed on a side of an inlet of the core forming curable resin has a function of a liquid (core forming curable resin) reservoir. Furthermore, the through cavity that is disposed on a side of an outlet of the core forming curable resin is used, when the resin is filled in the concave portion of the mold, to perform vacuum suction to reduce pressure of the concave portion of the mold. There are no particular restrictions on a shape and a magnitude of the through cavity on the inlet side as far as the through cavity communicates with an inlet end of the concave portion and has a function as a liquid reservoir. Further, there are no particular restrictions on a shape and a magnitude of the through cavity on the outlet side as far as the through cavity communicates with an outlet end of the concave portion and can be used to apply the vacuum suction.

The through cavity disposed on the side of the inlet of the core forming curable resin of the mold concave portion has a function as a liquid reservoir. Accordingly, when a sectional area thereof, in the case of the mold being brought into close contact with the cladding substrate, is made larger on a side that comes into contact with the substrate and smaller as departs from the substrate, after the core forming curable resin is filled in the concave portion and cured, the mold becomes easily removed from the substrate. Since there is no need of providing a function of a liquid reservoir to the through cavity on the side of the outlet of the core forming curable resin, there is no need of particularly adopting such a sectional structure.

The mold with the through cavities can be formed, for instance, in such a way that a mold in which concave portions corresponding to optical waveguide core convex portions are formed and convex portions corresponding to the cavities as mentioned above is prepared, the mold is punched out into a predetermined shape to form through cavities, and, at this time the mold is punched out so that, inside of the through cavities, an inlet for filling the core forming curable resin and an outlet for exhausting the core forming curable resin from the concave portion may appear. Even in the case of the punched out through cavitiesince adhesiveness between the mold and the cladding substrate is excellent and a gap is not formed with the cladding substrate except for the mold concave portion, there are no worries of the core forming curable resin intruding into other than the concave portion.

Furthermore, the through cavity may be formed not only by removing all of the cured resin layer (punched out type) in a thickness direction of the mold as mentioned above but also by partially leaving the mold in a thickness direction of the mold. In this case, the mold is disposed so that the through cavity may be exposed below the cladding substrate.

Examples of the preparation of the mold with the through cavities further include a method in which an master plate is provided with not only convex portions corresponding to the optical waveguide cores but also with convex portions for forming the through cavities (in the case of punched out through cavities, a height of this convex portion is made higher than a thickness of the cured resin layer of the mold-forming curable resin); on the master plate the mold-forming curable resin is coated so that the convex portions for the through cavities may punch through the resin layer (punched out through cavity) or the convex portions may hide; subsequently, the resin layer is cured; and, thereafter, the cured resin layer is removed from the master plate.

It is clear that methods of forming a waveguide core are not limited to the above methods and it is possible to produce a core having a cavity that constitutes a reflecting surface on a substrate by a direct exposure method or an etching method.

Also, in the present invention, the configuration in which the cavity is formed inside the optical waveguide core may be a configuration in which the side surfaces of the core are enclosed by the waveguide core and the top and bottom of the core are sealed by the clad by allowing the cavity to penetrate the waveguide core, a configuration in which only one of the top and bottom of the cavity is in contact with a clad or a configuration in which the whole periphery of the cavity is enclosed in the waveguide core. However, the configuration in which the top and bottom of the core are in contact with the clad by allowing the cavity to penetrate the waveguide core is preferable because signal lights that propagate in the waveguide core is scarcely scattered at the top and bottom of the cavity.

EXAMPLES

The present invention will be hereinafter explained in more detail illustrated by the following examples, however the present invention is not limited to these examples.

Example 1

Figure 7:
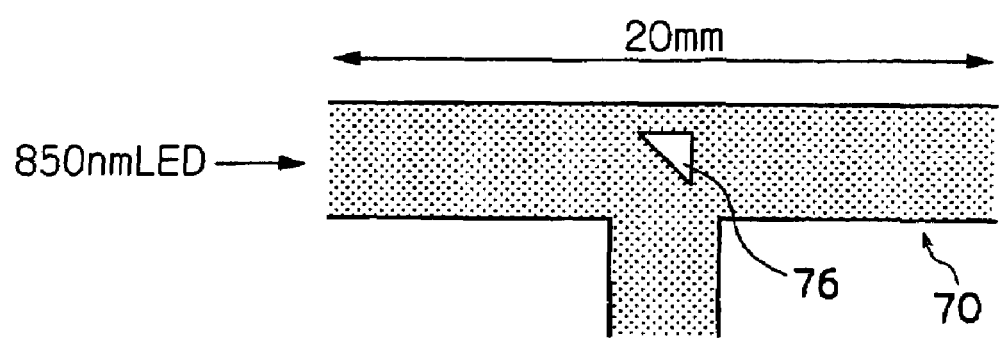
FIG. 7 is a view corresponding to FIG. 1 which shows the optical waveguide of Example 1.

As shown in FIG. 7, a main waveguide is 100 µm by 100 µm and has a length of 20 mm, a gas cavity constituted of air has a configuration which is an isosceles triangle structure in which the sides forming a right angle are each 50 µm in length and has a plane inclined at an angle of 45° in the direction of light propagation in the main waveguide and disposed at the center of the main waveguide and a branched waveguide which is 100 µm by 100 µm and has a length of 5 mm. A ultraviolet ray-curable polymer having a refractive index of 1.54 is used for a core, a ultraviolet ray-curable polymer having a refractive index of 1.51 is used as a clad and ARTON FILM® (manufactured by JSR Corporation) is used as a bottom substrate. An LED having a wavelength of 850 nm is disposed on the incident side through a φ62.51 µm GI fiber and the light receptor side of each end part of the main waveguide, and a branched waveguide is connected to a light intensity measurer through a φ200 µm HPCF-GI fiber to measure the insertion loss of the incident light. Also, a matching oil is used at the connecting member.

As a result of measurement, each insertion loss of incident light is:
Main waveguide: 3.8 dB
Branched waveguide: 4.7 dB.

Example 2

As shown in FIG. 8, a main waveguide is 50 µm by 50 µm and has a length of 10 mm, a gas cavity constituted of air has a configuration which is an isosceles triangle structure in which the sides forming a right angle are each 50 µm in length has a plane inclined at an angle of 45° in the direction of light propagation in the main waveguide and disposed at the center of the main waveguide and the main waveguide which extends 10 mm in the direction at an angle of 90° in the direction of the main waveguide from the border of the air part. An ultraviolet ray-curable polymer having a refractive index of 1.54 is used for a core, an ultraviolet ray-curable polymer having a refractive index of 1.51 is used as a clad and ARTON FILM® (described above) is used as a top and a bottom substrate. An LED having a wavelength of 850 nm is disposed on the incident side through a φ62.5 µm GI fiber, and the main waveguide end is connected to a light intensity measurer through a φ200 µm HPCF-GI fiber, to measure the insertion loss of the incident light after the incident light is reflected. Also, a matching oil is used at the connecting member.

As a result of measurement, the insertion loss of incident light is 1.5 dB.

Example 3

Production of a Master Plate

As shown in FIG. 9A, a thick film resist is applied to a Si substrate 80 by a spin coating method, then pre-baked at 80° C., subjected to exposure through a photomask, and then developed to form waveguide core convex portions 82 and 84 for changing the direction of light propagation and a concave portion 86 for a cavity in a core (core width: 100 µm, cavity width: 50 cm). The substrate is post-baked at 120° C. to produce a master plate for manufacturing an optical waveguide core and a cavity in the core.

Production of a Mold

Next, after a releasing agent is applied to the master plate, a heat-curable dimethylsiloxane resin (trade name: SYL-GARD184, manufactured by Dow Coning Asia Ltd.) is poured into the master plate, allowed to stand for a fixed time, then subjected to defoaming under a vacuum for 10 minutes, and heated at 120° C. for 30 minutes to solidify the resin. The solidified resin is then released to produce a mold 80A having a concave portion 82A corresponding to a main waveguide, a concave portion corresponding to a branched waveguide 84A and a convex portion 86A (thickness of the mold: 5 mm) at the place corresponding to the cavity within the main waveguide. Moreover, cavities each having a diameter of 3 mm are opened at both ends of the main waveguide and at one end of the branched waveguide as a core filling port 90 and suction ports 92.

Then, as shown in FIG. 9C, the mold 80A is brought into close contact with a film substrate (ARTON FILM®, described above, refractive index: 1.51) 94.

Next, the core filling port 90 formed in the mold is fully filled with a ultraviolet ray-curable resin (manufactured by JSR Corporation, refractive index of the cured resin: 1.54) having a viscosity of 800 mPa·s to suck the resin from each suction port 92 of the end part of the main waveguide 82A and the end part of the branched waveguide 84A, with the result that the ultraviolet ray-curable resin is filled in the main waveguide part, except at the gas cavity part and the branched waveguide part.

Then, the resin in the mold is irradiated with 50 mW/cm$^2$ ultraviolet light through the aforementioned mold (dimethylsiloxane resin) for 5 minutes to cure the resin and then the mold is released to produce a waveguide core having an air cavity on the ARTON FILM® (described above).

An ultraviolet ray-curable resin for a clad which has a viscosity of 730 mPa·s and a refractive index of 1.51 is applied to the periphery of the waveguide core provided with an air cavity on the aforementioned ARTON FILM® (described above). At this time, the clad agent does not intrude into the core cavity because of the viscosity specific to an uncured polymer. One more sheet of the above-mentioned ARTON FILM® (described above) is prepared and sandwiched through the clad agent.

The resin is immediately irradiated with 50 mW/cm$^2$ ultraviolet light through an ARTON FILM® (described above) to cure the resin.

Finally, the mold is cut out by a dicing saw to form the end part of the waveguide.

An optical waveguide is thus produced by the above steps.

In the aforementioned Example 3, the cavity is formed simultaneously when the waveguide core is formed, and it is therefore understood that this process has high manufacturing efficiency.

What is claimed is:

1. An optical waveguide comprising:
   a waveguide core having a cavity surrounded by the waveguide core; and
   a clad which encloses the periphery of the waveguide core and has a smaller refractive index than the waveguide core has,
   wherein the optical waveguide changes a direction of a part or all of propagated light by using a part or all of an interface between the waveguide core and the cavity as a reflecting surface;
   wherein an area, in which a projected area that is obtained by projecting the reflecting surface in the direction of the waveguide core overlaps with a cross-sectional plane of the waveguide core, is smaller than a cross-sectional area of the waveguide core; and
   a branched waveguide is formed therein which divides the propagated light incident to the waveguide core into light which reflects on the reflecting surface and light, other than light reflected at the reflection surface, which travels in linear propagation in the waveguide core.

2. The optical waveguide of claim 1, wherein the clad comprises a polymer material.

3. The optical waveguide of claim 1, wherein an angle of the reflecting surface is set at an inclined angle at which the propagated light is totally reflected.

4. The optical waveguide of claim 1, wherein a branched waveguide core that propagates the propagated light reflected on the reflecting surface is provided, and a sectional area of the propagated light reflected on the reflecting surface, which is perpendicular to the direction in which the propagated light travels and is in the vicinity of the branched part, is smaller than the sectional area of the branched waveguide core and is contained within the branched waveguide.

5. An optical waveguide according to claim 1, wherein the reflecting surface is a planar surface that is perpendicular to a plane that is parallel to (i) a direction of propagated light and (ii) a direction of reflected light.

6. An optical waveguide comprising:
   a waveguide core having a cavity surrounded by the waveguide core; and
   a clad which encloses the periphery of the waveguide core and has a smaller refractive index than the waveguide core has,
   wherein the optical waveguide changes a direction of a part or all of propagated light by using a part or all of an interface between the waveguide core and the cavity as a reflecting surface;
   wherein an area, in which a projected area that is obtained by projecting the reflecting surface in the direction of the waveguide core overlaps with a cross-sectional plane of the waveguide core, is identical to a cross-sectional area of the waveguide core; and
   the waveguide core is set so as to be larger only at a portion where the cavity is present.

7. The optical waveguide of claim 6, wherein the clad comprises a polymer material.

8. The optical waveguide of claim 6, wherein an angle of the reflecting surface is set at an inclined angle at which the propagated light is totally reflected.

9. An optical waveguide according to claim 6, wherein the reflecting surface is a planar surface that is perpendicular to a plane that is parallel to (i) a direction of propagated light and (ii) a direction of reflected light.

10. An optical waveguide comprising:
    a waveguide core having a cavity surrounded by the waveguide core; and
    a clad which encloses the periphery of the waveguide core and has a smaller refractive index than the waveguide core has,
    wherein the optical waveguide changes a direction of a part or all of propagated light by using a part or all of an interface between the waveguide core and the cavity as a reflecting surface; and
    wherein at least one of both end portions on a diagonal face of the reflecting surface is positioned outside of a line extending from an outside periphery of the waveguide core at the upstream side in the direction in which the propagated light travels, and the waveguide core at the cavity location is enlarged to surround the cavity.

11. The optical waveguide of claim 10, wherein the clad comprises a polymer material.

12. The optical waveguide of claim 10, wherein an angle of the reflecting surface is set at an inclined angle at which the propagated light is totally reflected.

13. An optical waveguide according to claim 10, wherein the reflecting surface is a planar surface that is perpendicular to a plane that is parallel to (i) a direction of propagated light and (ii) a direction of reflected light.

* * * * *